United States Patent
Fortier et al.

(10) Patent No.: US 6,584,179 B1
(45) Date of Patent: Jun. 24, 2003

(54) METHOD AND APPARATUS FOR IMPROVING THE UTILITY OF SPEECH RECOGNITION

(75) Inventors: Stéphane Fortier, St-Georges (CA); Colin A. Reid, Ottawa (CA); L. Lloyd Williams, Kanata (CA); Jean Bouchard, Beauport (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 08/957,735

(22) Filed: Oct. 24, 1997

(51) Int. Cl.[7] .............................................. H04M 3/493
(52) U.S. Cl. .............................. 379/88.01; 379/218.01; 704/270
(58) Field of Search .......................... 379/88.01, 88.03, 379/88.04, 88.22, 201, 207, 210, 211, 212, 213, 214, 93.17, 93.23, 201.04, 213.01, 218.01, 428.03; 704/231, 251, 252, 257, 270, 275

(56) References Cited

U.S. PATENT DOCUMENTS

| | | | | |
|---|---|---|---|---|
| 5,127,055 A | * | 6/1992 | Larkey | |
| 5,222,121 A | * | 6/1993 | Shimada | 379/88 |
| 5,230,023 A | * | 7/1993 | Nakano | 381/110 |
| 5,864,603 A | * | 1/1999 | Haavisto et al. | 379/88 |
| 5,912,949 A | * | 6/1999 | Chan et al. | 379/88.03 |
| 5,924,070 A | * | 7/1999 | Ittycheriah et al. | 379/88.03 |
| 5,933,804 A | * | 8/1999 | Huang et al. | 704/244 |
| 5,950,160 A | * | 9/1999 | Rozak | 704/252 |
| 5,956,681 A | * | 9/1999 | Yamakita | 704/260 |
| 5,956,683 A | * | 9/1999 | Jacobs et al. | 704/275 |
| 6,049,594 A | * | 4/2000 | Furman et al. | 379/67.1 |
| 6,236,715 B1 | * | 5/2001 | Wong | 379/88.03 |
| 6,359,971 B1 | * | 3/2002 | Haimi-Cohen et al. | 379/88.01 |
| 6,490,561 B1 | * | 12/2002 | Wilson et al. | 704/251 |

* cited by examiner

Primary Examiner—Scott L. Weaver
(74) Attorney, Agent, or Firm—Foley & Lardner

(57) ABSTRACT

A method and apparatus for improving the utility of speech recognition is described. The method involves capturing a spoken word, passing the spoken word to a speech recognition algorithm, receiving at least one text representation of the spoken word from the speech recognition algorithm, and passing a text representation of the spoken word to a display telephone to permit the user to select the correct representation of the voice response. The apparatus is an access server which communicates with a display telephone, a speech recognition algorithm which responds to queries from the access server and one or more databases which likewise respond to queries from the access server. The method and apparatus are particularly useful in automating such functions as telephone directory services using display telephones. The advantage is the ability to completely automate directory services for owners of display telephones and to significantly broaden the applications for speech recognition as a tool in information retrieval and transaction processing.

26 Claims, 8 Drawing Sheets

METHOD AND APPARATUS FOR IMPROVING THE UTILITY OF SPEECH RECOGNITION

TECHNICAL FIELD

This invention relates generally to the field of speech recognition and, in particular, to an apparatus and method for improving the utility of speech recognition, especially in respect of automated processes for retrieving information from a database.

BACKGROUND OF THE INVENTION

The desirability of retrieving information from databases using speech recognition as a means for converting spoken words into indicia useful in retrieving information has long been recognized. A principal application for this technology has been the partial automation of telephone directory assistance services. Telephone companies and telephone equipment manufacturers have invested considerable resources in developing systems to reduce the labour costs associated with providing directory assistance services. Much of that investment has been in speech recognition algorithms designed to facilitate directory look-ups.

Although speech recognition algorithms have been consistently improved, they have to date failed to provide complete automation solutions for information retrieval applications such as directory assistance. Due to the nature of spoken language, speech recognition is inherently limited in its ability to discriminate between words which are pronounced alike but spelled differently. The utility of speech recognition is further challenged by the current mobility of the world population which contributes to a diverse ethnic mix and consequently a variety of accents and inflections in most urban centres. Consequently, most speech recognition algorithms, although finely tuned and inventively designed, are incapable of enabling complete automation of an information retrieval system.

The inherent limitations in speech recognition are readily understood. For example, humans as well as machines have difficulty in distinguishing between the sounds uttered for the letters B, C, D, E, G, P, T, V and Z. In addition, it is substantially impossible to determine the spelling of certain words, including names, based on their pronunciation. For example, the names John, Jon and Jean may all be pronounced similarly enough that discrimination of the true spelling is impossible. Likewise, the names Mary Ann, Maryanne and Marianne are simply impossible to differentiate as spoken words. Other examples too numerous to mention may be readily recited by speech scientists.

A need therefore exists for a method of improving the utility of speech recognition in order to permit the automation of functions which are usefully implemented using speech recognition technology.

SUMMARY OF THE INVENTION

It is an object of the invention to provide a method and apparatus for improving the utility of speech recognition to permit the automation of information retrieval systems which use speech recognition as the primary engine for information retrieval.

It is a further object of the invention to provide a method of implementing speech recognition that enables the automation of transactions that may be accomplished over the switched telephone network.

It is another object of the invention to provide a method and apparatus for improving the utility of speech recognition which is relatively easy to design and inexpensive to implement.

It is yet a further object of the invention to provide a method and apparatus of improving the utility of speech recognition that is designed to enable the complete automation of telephone directory assistance services.

In accordance with a first aspect of the invention there is provided a method of improving the utility of speech recognition of words spoken by a speaker, comprising:

a) capturing in electronic form a word spoken by the speaker;

b) passing the word to a speech recognition algorithm;

c) receiving from the speech recognition algorithm at least one representation of the word;

d) displaying for the speaker as text the at least one representation of the word to permit the speaker to select a correct representation of the word from among the at least one representation; and e) repeating the steps of a)–c) in an event that none of the representations of the word are verified as correct, or enabling the speaker to communicate the at least one word in another way.

In accordance with the second aspect of the invention, there is provided apparatus for improving the utility of speech recognition of words spoken by a speaker, comprising a computer enabled to receive voice and data signals over a communications link, the computer being programmed to prompt a user for spoken words which are received from the communications link as voice signals and to pass the spoken words to a speech recognition algorithm which returns representations of the spoken words to the computer; the computer being further enabled to pass the representations of the spoken words to a voice terminal with a display surface which displays the representations for the user to permit the user to select a correct representation of the spoken words to thus improve the utility of the speech recognition of the words.

In accordance with yet a further aspect of the invention, there is provided a method of automating telephone directory services for telephone users having display telephones, comprising the steps of:

a) prompting a user accessing the directory services for names used as indicia to locate an entity in the directory;

b) accepting from the user a spoken name for each index;

c) passing each spoken name to a speech recognition algorithm and accepting from the speech recognition algorithm at least one representation of the spoken name;

d) displaying as text on the display telephone the at least one representation of the spoken name to permit the user to select a correct representation of the spoken name; and e) assembling a query to the directory after a correct representation of each index has been selected in order to retrieve a record for the entity from the directory.

The invention therefore provides a method and an apparatus for improving the utility of speech recognition and enables a much broader application of speech recognition technology, especially in the implementation of services which entail the retrieval of information from databases. In accordance with the method, a database query is assembled by prompting a user to verbally indicate each of several names which may be used as indexes for retrieving a record of interest from a database. Each name may consist of one or more spoken words. The names are preferably requested in sequence and each name is preferably verified by passing the spoken words to a speech recognition algorithm which returns at least one text representation of the spoken name. The representations of the spoken name are then presented to the speaker who is permitted to select the correct representation of the spoken name. After all of the names required for a query have been correctly identified, a query is assembled and submitted to the database. This permits an accuracy of information retrieval which was heretofore unattainable using speech recognition alone.

The apparatus in accordance with the invention consists of voice terminals having display surfaces for displaying characters and a computer which may be accessed by the voice terminals. The computer in turn has access to a speech recognition algorithm and a database which stores the information of interest. Software enables the computer to prompt the user to utter the names required as indicia for locating a record of interest in the database. Software also enables the computer to submit captured voice signals to the speech recognition algorithm which returns one or more textual representations of the spoken name. Graphical representations of the spoken name are displayed as text on the display surface of the voice terminal to permit the user to select the correct representation. The invention may therefore be inexpensively implemented to enable a wide variety of applications.

The method and apparatus in accordance with the invention is particularly adapted to providing completely automated directory services to individuals having display telephones. The display telephones are preferably adapted to conform to the Analog Display Services Interface (ADSI) standard FR-12 developed by Bellcore. The computer is preferably a server which may be accessed by a dial-up voice-grade connection. The speech recognition algorithm may reside on the same server or may reside on another server in a local or wide-area network. Preferably, at least one speech recognition algorithm is provided in every region of a telephone network in order to permit regional training for the recognition of locality names as spoken by local speakers. The directory database, on the other hand, is preferably accessed through a wide-area network and centralized to eliminate maintenance duplication and maximize accuracy.

It will be well understood by those skilled in the art that this technology may be used in many other applications where information is usefully retrieved or transactions are conducted using spoken language. The method and apparatus in accordance with the invention may therefore also be used, for example, to implement a voice order system for telephone retail sales operations, an automated voice reservation system for hotel accommodations, and many other applications too numerous to mention.

BRIEF DESCRIPTION OF THE DRAWINGS

The invention will now be further explained by way of example only and with reference to the following drawings wherein.

DETAILED DESCRIPTION OF THE PREFERRED EMBODIMENT

This invention relates to a method and apparatus for improving the utility of speech recognition using text prompts to verify spoken words converted to text by a speech recognition algorithm. The method and apparatus are particularly well adapted for providing automated directory services in the telephone network. The invention may also be used for the provision of more complex automated services including automated speech ordering for product sales, automated system for the reservation of accommodations, and the like.

Figure 1:
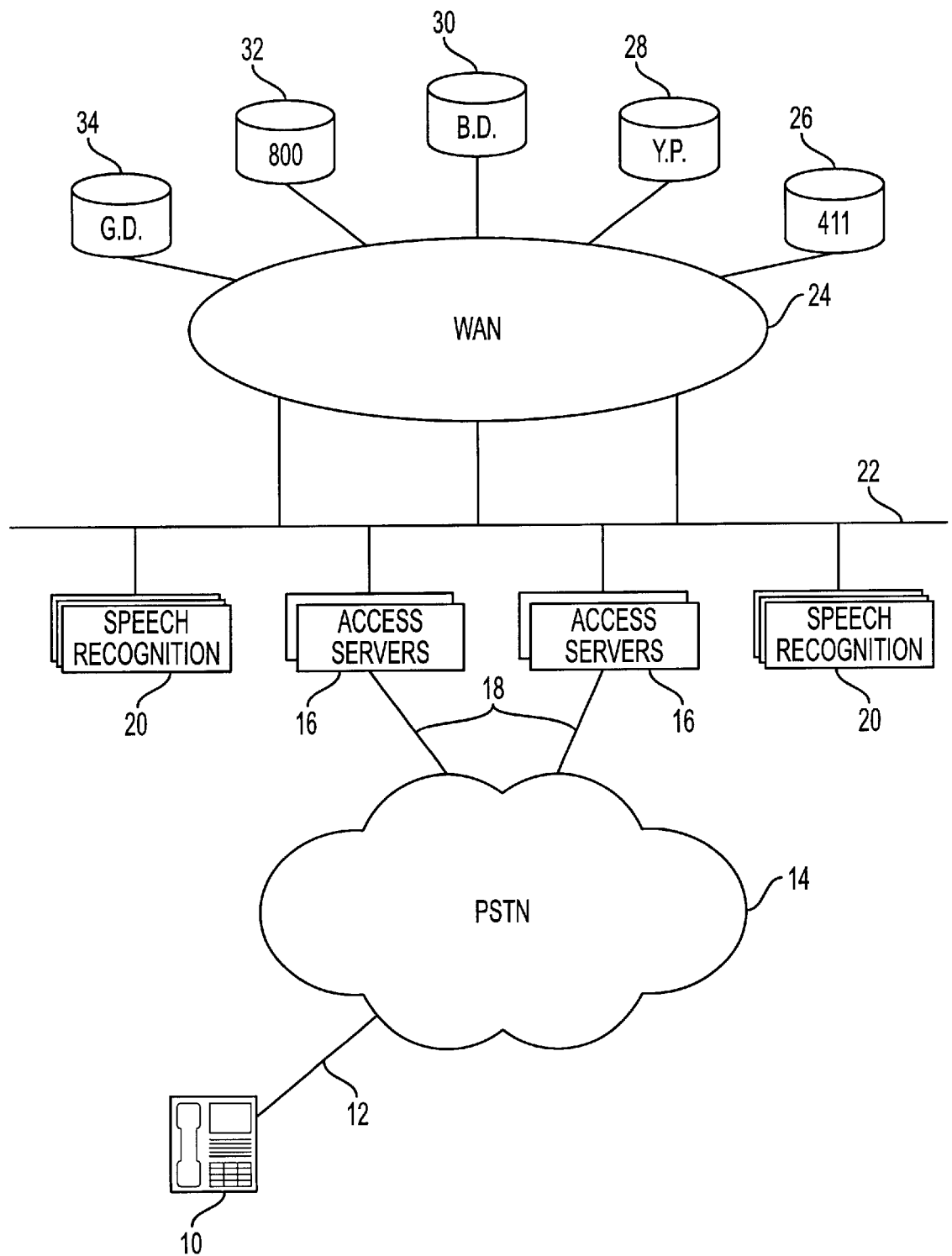
FIG. 1 is a schematic diagram of a portion of a network which includes the apparatus in accordance with the invention arranged in a configuration suitable for retrieving information from telephone directory databases.

FIG. 1 shows a schematic diagram of a portion of a network which includes the apparatus in accordance with the invention. The apparatus is configured to provide directory services to subscribers having a display telephone 10. The display telephone 10 is preferably a telephone which conforms to the Analog Display Services Interface (ADSI) standard. Such display telephones are available for example from Nortel of Ottawa, Ontario, Canada; Phillips Home Services Inc. of Burlington, Mass., USA; or Cidco In. of Morgan Hill, Calif., USA. The ADSI display telephone 10 is connected by an Analog line 12 to the Public Switched Telephone Network (PSTN) 14. It should be understood by those skilled in the art that although the invention described below is described with reference to an ADSI display telephone 10, the invention may also be implemented using a digital telephone or any other voice terminal which has a character display capability and responds to commands received from a remote computer in the client/server model.

The apparatus in accordance with the invention includes one or more access servers 16 connected to the PSTN 14 by voice grade connections 18 which may be lines or trunks, for example ISDN PRI trunks, which are well known in the art. The access servers 16 may query speech recognition algorithms 20 in order to convert words spoken by subscribers using the ADSI display telephone 10 into one or more representations of the spoken words in a manner well known in the art. The speech recognition algorithms 20 may be resident on the access server 16 or resident on other servers connected to a local or a wide area network 22. The speech recognition algorithm 20 may be for example an algorithm such as the one described in U.S. Pat. No. 5,479,488 which issued to the applicant on Dec. 26, 1995 or one such as described in U.S. Pat. No. 5,644,680 which issued to Northern Telecom Limited on Jul. 1, 1997.

The local area network 22 is connected to a wide area network 24 in a manner well known in the art. The wide area network 24 provides access to a plurality of directory databases which include, for example, a "411" database of residential numbers 26, a Yellow Pages database, a database of business numbers 30, a database of 800 numbers 32, and a global database 34 which may include a variety of information respecting entities for which records exist. The databases 26–34 are exemplary only of the types of databases from which information may be retrieved using the improved speech recognition method and apparatus in accordance with the invention.

Figure 2:
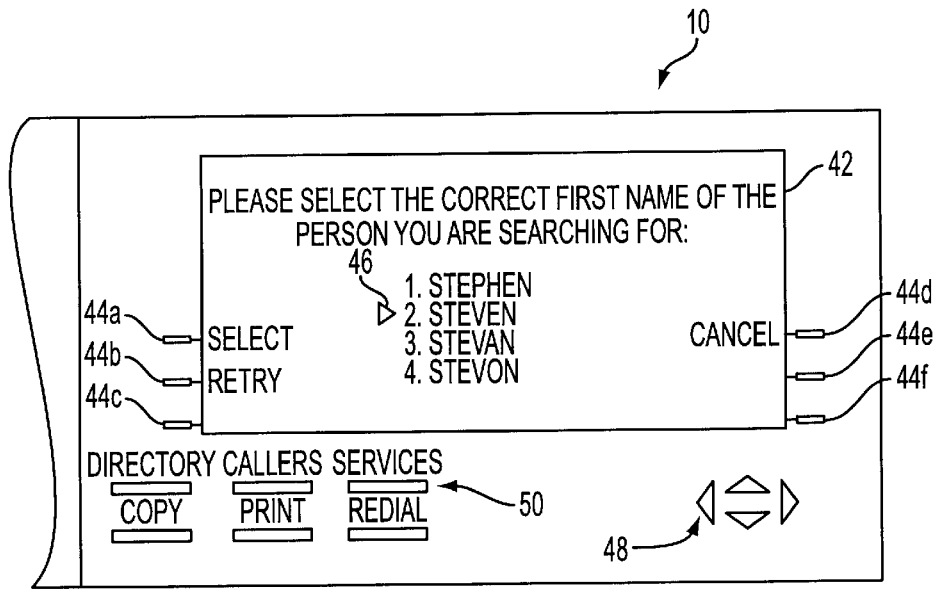
FIG. 2 is a schematic diagram of a portion of a display telephone which may be used to implement the method in accordance with the invention.

FIG. 2 shows a portion of an ADSI display telephone 10 which constitutes a part of the apparatus useful in practicing the methods in accordance with the invention. The displayed portion of the ADSI display telephone 10 includes a display surface 42 which is enabled to display text characters and simple graphics. Located on each lower side of the display surface 42 are "soft keys" 44a–f. The function of each soft key 44a–f is allocated dynamically with each display on the display surface 42. In this example, soft key 44a enables the user to select one of the four options displayed. If soft key 44a is pressed with the display surface 42 in the condition illustrated, the subscriber will select the first name "Steven". If the subscriber selects soft key 44b, a retry signal will be sent to the access server 16 (see FIG. 1) and the process of selecting a first name will be reinitiated, as will be explained below in more detail with reference to FIGS. 4a–4e. If the subscriber presses soft key 44d, the current search will be abandoned and the subscriber will be provided with options for disconnecting from the directory service or commencing a new search, for example. A cursor 46 indicates an item to be selected by the soft key 44a. The position of the cursor 46 on the display surface 42 may be changed using the cursor control keys 48 in a manner well known in the art.

Six function keys 50 are generally provided on the ADSI display telephone 10. The functions of those keys are manufacturer dependent and are not relevant to the invention.

Figure 3:
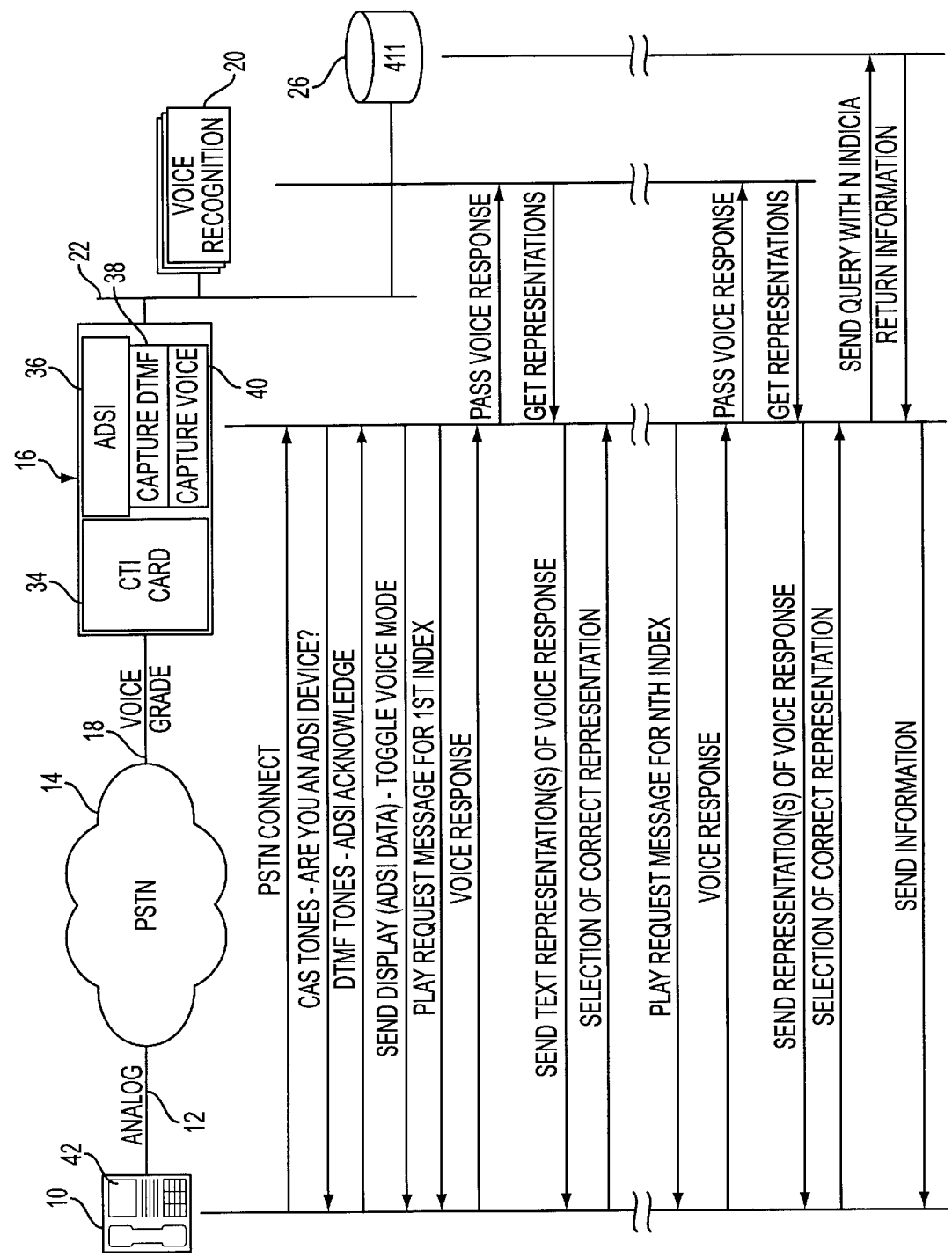
FIG. 3 is a schematic diagram showing the information flow during the retrieval of a record from a database using the method and apparatus in accordance with the invention.

FIG. 3 is a schematic diagram showing an information flow during the retrieval of a record from a database using the method and apparatus in accordance with the invention. As explained above with reference to FIG. 1, an ADSI display telephone 10 is connected by an Analog line 12 to the PSTN 14. The access server 16 is connected by a voice grade connection 18 to the PSTN 14. In order to connect to the access server 16, a subscriber dials a predetermined number using the ADSI display telephone 10. The access server 16 includes a computer telephony integration (CTI) card 34 that complies with the Bellcore FR-12 standard available, for example, from the Dialogic Corporation of Parsippany, N.J., USA. The access server 16 also includes a processor and other hardware well known in the art which are standard components of a computer suitable to function as a server in a local or a wide area network. The access server 16 is equipped with applications to implement an ADSI interface to handle communications with the ADSI display telephone 10 in a manner in accordance with the Bellcore Standard FR-12 Analog Display Services Interface. The ADSI application 36 includes a Dual Tone Modulated Frequency (DTMF) capture section 38 and a voice capture section 40. Each of the DTMF capture section 38 and the voice capture section 40 monitor the voice grade line 18 to detect any DTMF or voice signals received on the voice grade line 18. The DTMF capture section 38 has precedence and extracts any DTMF tones generated by the ADSI display telephone 10, in a manner well known in the art.

FIG. 3 illustrates a simplified rendition of the information exchanged between the ADSI display telephone 10, the access server 16, the speech recognition algorithm 20, and the 411 residential number directory database 26 when a subscriber uses the ADSI display telephone 10 to obtain the telephone number of a person from the 411 directory. As explained above, in order to obtain a telephone number from the 411 directory 26, the subscriber dials a pre-assigned number which connects the ADSI display telephone 10 to the access server 16. When the access server 16 receives a call over the voice grade connection 18, it returns CAS tones in accordance with the ADSI standard to interrogate the calling voice terminal to ensure that it is an ADSI device. If the telephone is an ADSI device such as ADSI display telephone 10, it responds to the CAS tones and returns DTMF tones in an ADSI acknowledgement message which enables the access server 16 to continue the transaction. If no DTMF tones in accordance with the ADSI standard are received from the connected telephone, the access server 16 plays back an appropriate service denial message (see FIG. 4a) and may announce alternate directory service options to the subscriber.

Assuming that the required DTMF tones for an ADSI display acknowledgement are received from the ADSI display telephone 10, the access server 16 sends display data in ADSI data format to the ADSI display telephone 10. The display data is accepted by the ADSI display telephone 10 and displayed on the display area 42 of the telephone to provide the subscriber with a visual introduction to the service. The ADSI display data is followed by a voice mode toggle in accordance with the ADSI standard to switch the ADSI display telephone 10 from data to voice mode in a manner established by the ADSI standard. The access server 36 subsequently plays a first request message for voice input from the subscriber. In the abbreviated information exchange illustrated in FIG. 3, the access server 16 immediately prompts the subscriber for a first index for the directory lookup. In real implementations, the first request message may be, for example, a request for a preferred language. That request may be followed by a request for the name of the directory of interest, for example any one of the databases 26–34 shown in FIG. 1. For the sake of clarity of illustration, FIG. 3 does not show those initial setup messages.

The request for the first index will, for example, be a request for the state or province in which the person resides for whom a telephone number is sought. The subscriber may therefore respond with a spoken name such as "Ohio". The subscriber's voice response is captured by the voice capture section 40 of the access server 16 and passed to the speech recognition algorithm 20 which processes the voice signal in a manner well known in the art to produce one or more representations of the voice signal. The speech recognition algorithm 20 returns one or more representations of the voice signal to the access server 16. The access server 16 sends a text representation of the voice response to the ADSI display telephone 10 which displays the text representations on the display surface 42. As explained above with reference with FIG. 2, the ADSI display telephone 10 includes a plurality of soft keys 44a–f and cursor control keys 48 which permit the subscriber to select the correct text representation of the voice response or to restart the process. In this instance, the speech recognition unit 20 may have returned "Ohio" and "Iowa". Since the subscriber is interested in the state of Ohio, the subscriber operates the soft keys to select "Ohio". The selection is returned as DTMF tones to the access server 16. The DTMF capture section 38 of the access server 16 captures the DTMF tones and determines that the first index to be used for a database query is the state of "Ohio".

The first index is stored and the process is repeated for the remainder of the indexes required to retrieve a record from the database. In the instance of a residential telephone directory, the indexes generally further include city, last name and first name or initial. In the example shown in FIG. 2, the "Nth" index is first name. The first name of the party being sought may be for example "Steven". After the access server 16 plays a request for the first name of the party, the user responds with "Steven". The access server 16 captures the voice signal and forwards it to the speech recognition unit 20 which returns four responses, namely: "Stephan", "Steven", "Stevan", and "Stevon". Using soft keys 44a–f and cursor control keys 48 on the display telephone 10, the user selects "Steven" (see FIG. 2) and that selection is returned to the access server 16.

The access server 16 now is in possession of all the indicia required to formulate a query to the database 26. The access server 16 therefore formulates a query which includes the "N" indicia and forwards the query to the database 26 over the Wide Area Network 24. On receipt of the query, the 411 directory of residential numbers 26 retrieves one or more records matching the "N" indicia. The one or more records are returned in an information package to the gateway server 16 which sends the information package to the ADSI display telephone 10. On receipt of the information package, the one or more records are displayed on the display surface 42 to permit the user to select the correct record using name and address as selection criteria. Thus, a completely automated directory service may be provided.

It will be understood by those skilled in the art that the speech recognition algorithm 20 may not always be able to return a correct representation of a spoken word. This may occur if the subscriber has an unusual accent or a search is conducted for a very unusual name which the speech recognition algorithm is not equipped to recognize. It is therefore preferable that another way of supplying a name be provided. This may be accomplished in several ways. After an unsuccessful attempt at providing a correct representation of a name, one of the soft keys 44a–f may be enabled to permit the subscriber to verbally spell the name, in which case a speech recognition algorithm 20 must be provided which has an alpha recognition capability to permit it to recognize the letters of the alphabet in the language of interest. Normally, a separate alpha recognition algorithm is used for this purpose. Alternatively, one of the soft keys 44a–f may be enabled to permit the subscriber to manually spell the name using the dialing key pad of the ADSI display telephone 10. Manual spelling may be accomplished, for example, by programming the ADSI display telephone 10 and the access server 16 to recognize different letters of the alphabet by the number of times in succession that a dialing key is pressed. For example, the "2" key pressed once equals "A" and pressed twice (2,2) equals "B", and the "9" key pressed three times (9,9,9) equals "Y". "Q" and "Z" must be separately accommodated. They may, for example, be assigned to the "7" and "9" keys respectively, in which case "7" pressed once equals "P", pressed twice equals "Q" (7,7), pressed three times equals "R" (7,7,7), and pressed four times equals "S" (7,7,7,7). The same sequence is used for the "9" key and the letters "W", "X", "Y" and "Z", respectively. If the apparatus in accordance with the invention is thus enabled to accept input in another way besides spoken words, a service such as a directory assistance service may be completely automated and still provide an acceptable level of user satisfaction. In real applications, of course, one of the soft keys 44a–f would normally be programmed to provide optional access to a live operator if a predefined number of restarts were encountered during a directory search.

In order to further illustrate the best mode of practising the invention, FIGS. 4a–e show a flow chart of a preferred arrangement of the logic enabled on the access servers 16 to permit retrieval of information from a database as shown in FIG. 3.

Figure 4A:
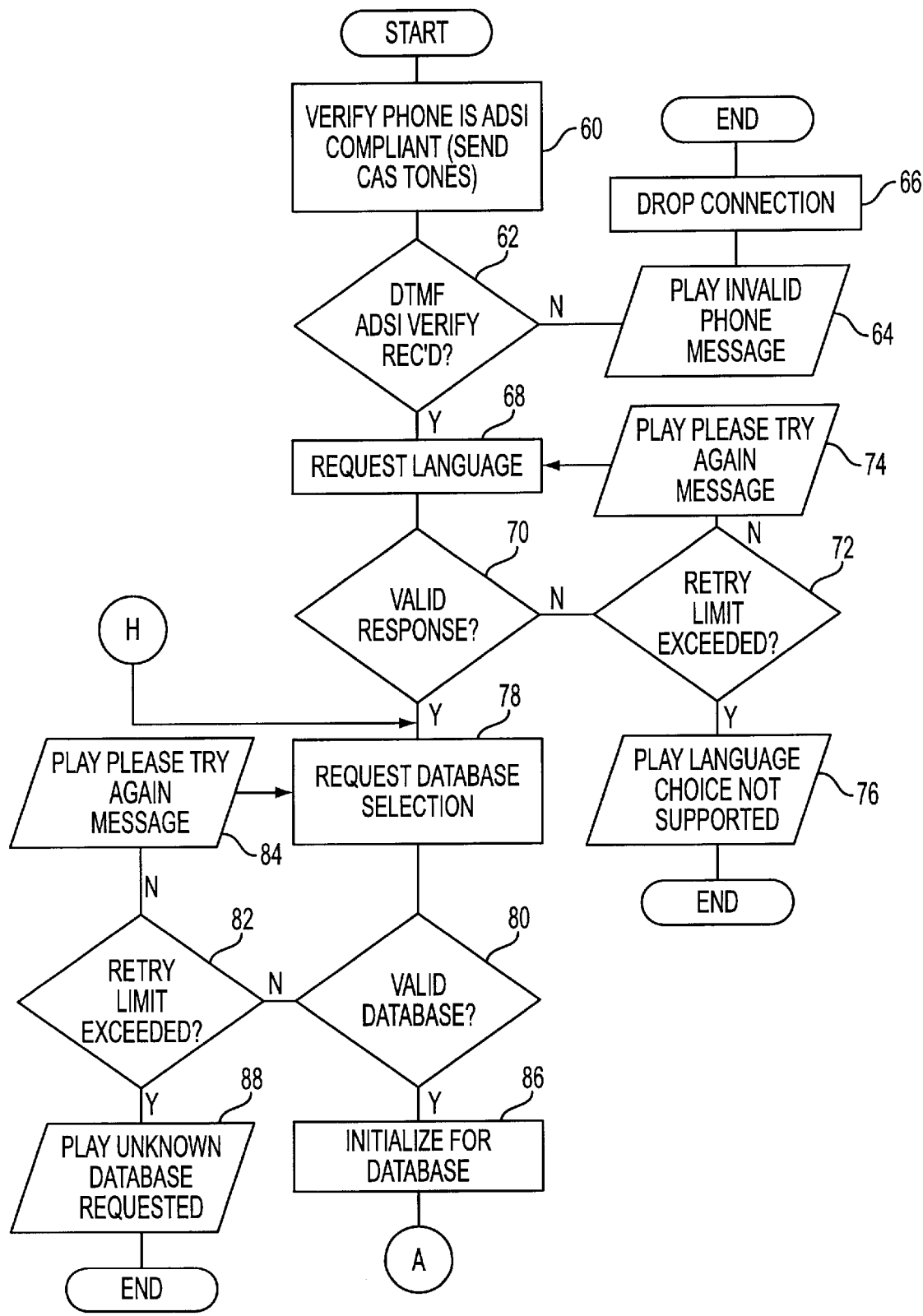
FIGS. 4a–e are flow charts of one way in which the logic executed by the apparatus in accordance with the invention may be organized.

As shown in FIG. 4a, when an access server 16 is accessed using the voice grade connection 18, it verifies that the accessing telephone is ADSI compliant by sending CAS tones to the calling telephone in a step 60, as described above with reference to FIG. 3. In step 62, the access server 16 determines whether DTMF tones constituting an ADSI confirmation message is received from the telephone to which the CAS tones were sent. If ADSI confirmation tones are not received, the access server 16 plays a pre-recorded "invalid telephone" message in step 64 and drops the connection in step 66, which ends processing. The invalid telephone message played in step 64 may include an announcement of alternate services which may be accessed by the caller without an ADSI compliant telephone.

If the calling telephone is determined to be ADSI compliant in step 62, an initialization process begins which may include, for example, a request for a language of preference in step 68. In step 70, the access server 16 evaluates the caller's verbal response to determine whether it is a valid option respecting choice of language. If it does not match one of the valid options, a retry limit is incremented and the limit is tested to determine whether it has exceeded a predefined limit in step 72. If the predefined limit has not been exceeded, an announcement is played requesting that the user please try again to select one of the languages in which the service is offered in step 74. If the predefined limit is found to be exceeded in step 72, a pre-recorded announcement that the language choice is not supported is played in step 76 and processing ends. If a valid response is received in step 70, the caller is requested in step 78 to request a database selection. The database selection requested in step 78 may be a request for a voice response or a request for a soft key response using the soft keys 44a–f (see FIG. 2). In step 80, a determination is made respecting whether a valid database has been selected. If an invalid response is received, a retry limit is incremented and the limit is tested to see whether a predefined limit is exceeded in step 82. If the limit has not been exceeded, the caller is requested to try again in step 84. If the retry limit has been exceeded the caller is played a pre-recorded message indicating that an unknown database has been repeatedly requested in step 88 and the call is terminated. When a valid database is selected, an initialization process is undertaken in step 86 to set pointers to the speech recognition algorithm and the database required to supply the desired information to the caller using the ADSI display telephone 10.

As explained above with reference to FIG. 3, the process in accordance with the invention for retrieving information from a database involves the steps of determining a value for a predefined number of indicia used to locate records in the database and formatting a query after the user has confirmed a correct value for each of the predefined indicia. FIGS. 4b–e illustrate the preferred logic involved in that process.

Figure 4B:
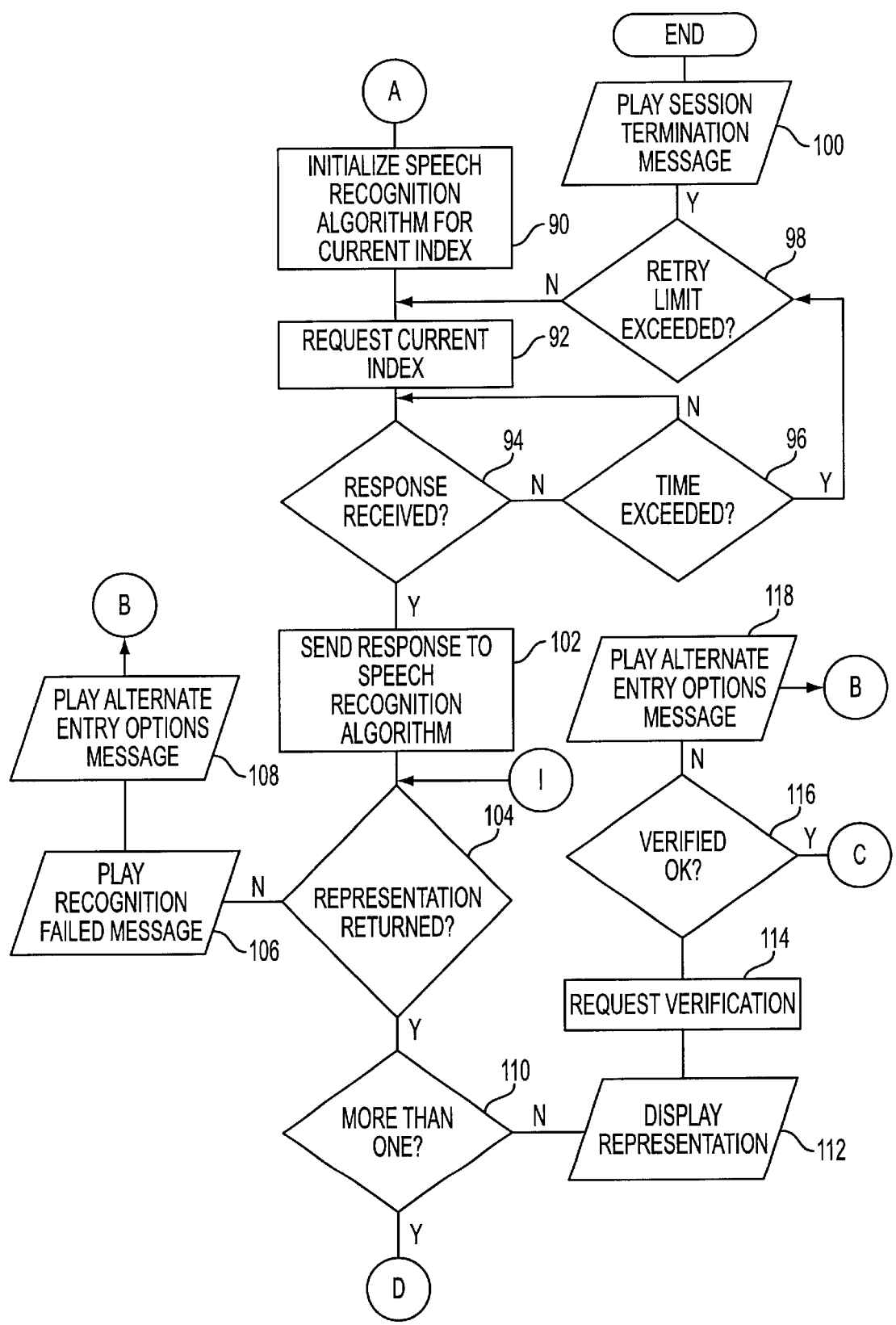
Figure 4C:
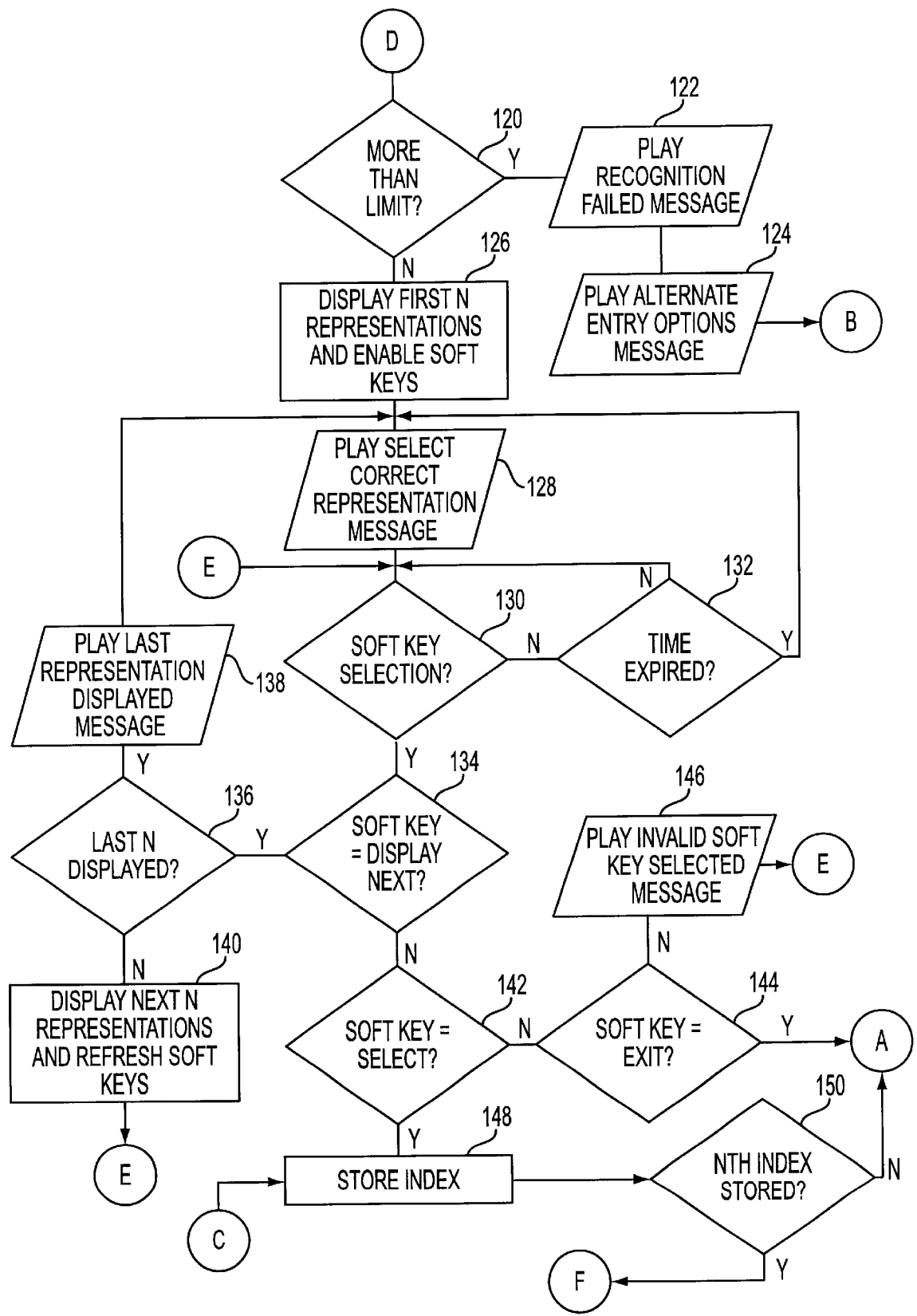

As shown in FIG. 4b, the process begins by initializing a speech recognition algorithm for a current index being sought from the caller in step 90. It is well understood in the art that in order to improve the efficiency of speech recognition, a predefined table of values are normally associated with each index so that speech recognition is more rapidly and accurately accomplished. The initialization in step 90 sets appropriate pointers to enable the access server 16 to conduct the required queries. After initialization, the access server 16 plays a pre-recorded announcement to request a spoken value for the current index, for example the state or province of residence of an individual for whom a telephone number is sought. In step 94, the access server 16 monitors the voice capture section 40 (see FIG. 3) to determine whether a response is received. If no response is received within a predetermined time interval tested in step 96, a retry limit is incremented and a determination is made in step 98 whether the retry limit is exceeded. If not, a repeat of the request for a current index is undertaken in step 92. If the retry limit is exceeded, an action such as a play session termination message in step 100 may be executed or the user may be provided with other options such as initiating a new query or selecting a new database.

Once a valid voice response to a request for the current index is received in step 94, the voice response is sent to the speech recognition algorithm in step 102 and the access server 16 waits for a representation of the voice response to be returned in step 104. If an empty response is returned, a pre-recorded announcement is played in step 106 to inform the caller that the speech recognition has failed and the caller is preferably presented with alternate entry options in step 108 to permit the index to be entered in another way, as will be explained below with reference to FIG. 4e.

Assuming that at least one representation was determined to be returned in step 104, if only one representation was returned, it is sent to ADSI display telephone 10 in step 112 and displayed for the caller. In step 114, the caller is requested to verify that the representation is an accurate representation of the index displayed in step 112. The request for verification may be a pre-recorded message or a question displayed on the ADSI display telephone 10, or both. In step 116, the access server 16 determines whether the voice request is verified as correct. If it is not verified as correct, the caller is preferably presented with alternate entry options in step 118 as will be explained below with reference to FIG. 4e. If the caller verifies that the representation is a correct representation of the spoken index, the program branches to connector "C" (see FIG. 4c) where the index is stored and the process is repeated for the next index in step 148, as will be explained below with reference to FIG. 4c.

Figure 4D:
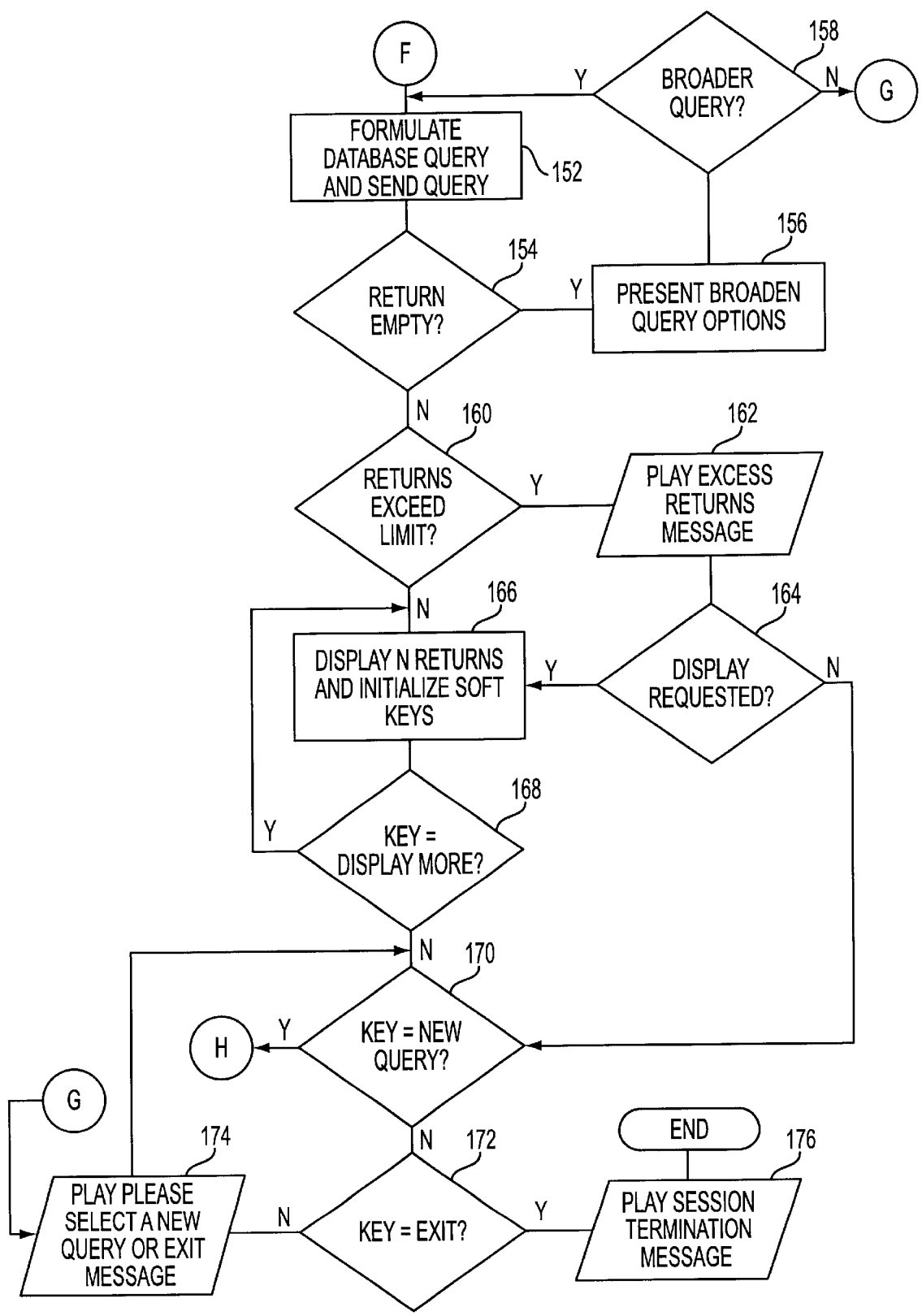

If it is determined in step 110 that more than one representation was returned from the speech recognition algorithm 20, the number of representations is compared to a predefined limit in step 120. If it is determined that the number of representations exceeds the predefined limit, the recognition is considered to have failed and a pre-recorded speech recognition failed message is played in step 122 and the caller is presented with alternate entry options in step 124, which will be explained below with reference to FIG. 4e. If the number of representations does not exceed the predetermined limit, the first "N" representations are sent to the ADSI display telephone 10 in step 126 as well as an assignment of functions for the soft keys 44a–f (see FIG. 3). In step 128, a pre-recorded message requesting that the caller select a correct representation from the list is played. In step 130, the DTMF capture section 38 is monitored to determine whether a soft key has been pressed within a predetermined time. If the time has been determined to have expired in step 132, the announcement played in step 128 is repeated. This program loop may include a program cancel function (not illustrated) to ensure that excessive repeats are not executed. If a soft key is selected, a determination is made in step 134 as to whether the soft key is a request to display the next "N" representations. If so, a determination is made in step 136 as to whether the last "N" representations have already been displayed. If the last "N" representations have been displayed, a message is played in step 138 indicating that the last of the representations have been displayed. It will be understood by those skilled in the art that a backup function may also be provided to permit the user to redisplay the previous "N" selections, although this is not illustrated. If all the representations have not been displayed, the next "N" selections are displayed in step 140 and the access server 16 returns to monitoring the DTMF capture section 38 to determine whether a soft key has been selected. Soft key monitoring includes determining whether the soft key indicates the selection of a representation in step 142. If it does not, a test is made to determine whether the soft key indicates a desire to exit in step 144. If it does not, an invalid soft key selected message is played in step 146 and soft key monitoring resumes. If the soft key is determined to indicate a desire to exit in step 144, the program returns to initializing the speech recognition algorithm for a current index at connector "A" (see FIG. 4b). If one of the representations is selected as a correct representation in step 142, the value of the representation is stored as an index in a predefined register in step 148 and the predefined registers are examined to determine whether the "Nth" index has been stored in step 150. If the "Nth" index has not be stored, the program is returned to connector "A" and the process of obtaining the next index is initiated. If the "Nth" index has been stored, the program proceeds to formulate a database query, the logic for which is shown in FIG. 4d.

After all indexes required for a database query have been accumulated and verified, the access server 16 formulates a database query in step 152 and sends the query to the appropriate database, database 26 for example (see FIG. 1). The access server 16 awaits a response from the database. The response may include zero records or may include a large number of records depending on the indicia submitted in the query. If in step 154 the return is determined to be empty, the access server 16 may present an option to the caller in step 156 to broaden the query. Normally, this is accomplished by truncating the least significant index of the indicia or blanking the least significant index of the indicia. For example, suppose that a caller searches for the telephone number of John Doe in Toronto, Ontario and the query returns empty, the caller may be presented with an option to reformulate the query for "J. Doe" in Toronto, Ontario. The number, method and options for broadening queries are a matter of design choice and are well known in the art.

In step 158, the access server 26 monitors the connection for an indication as to whether the caller wishes the query to be broadened. If the caller does not wish the query to be broadened, the program preferably branches to connector "G" in which a pre-recorded message is played requesting that the user please select a new query or exit. If the caller requested that the query be broadened, the access server 16 formulates the new query in step 152 and sends it to the database. Thereafter step 154 is repeated. If an empty query is not returned, a determination is made in step 160 whether the number of returns exceeds a predetermined limit. If that limit is exceeded, a pre-recorded message is played in step 162 informing the caller that an excess number of returns have been received from the database and requesting whether the caller wishes those returns displayed on the ADSI display telephone 10. A response is monitored in step 164 to determine whether a display of excess returns is requested. If so, a predetermined number of returns are sent to the ADSI display telephone 10 along with initialization of the soft keys appropriate for such display in step 166. Step 166 is also executed if a determination is made in step 160 that the number of returns does not exceed the predetermined limit. In step 168, the connection is monitored to determine whether a soft key indicates a "display more" command. If so, step 166 is repeated. If not, the caller has either located the record of interest or may initiate a new query. Therefore, in step 170, the connection is monitored by the access server 16 to determine whether a soft key indicates a desire for a new query. If so, the program returns to the connector "H" (see FIG. 4*a*). If not, it is determined in step 172 whether the soft key indicates a desire to exit. If the exit key is not selected, a pre-recorded message requesting that the caller select a new query or exit is played in step 174. If, the exit key is selected, a pre-recorded session termination message is played and the program ends, releasing all the resources in step 176.

Figure 4E:
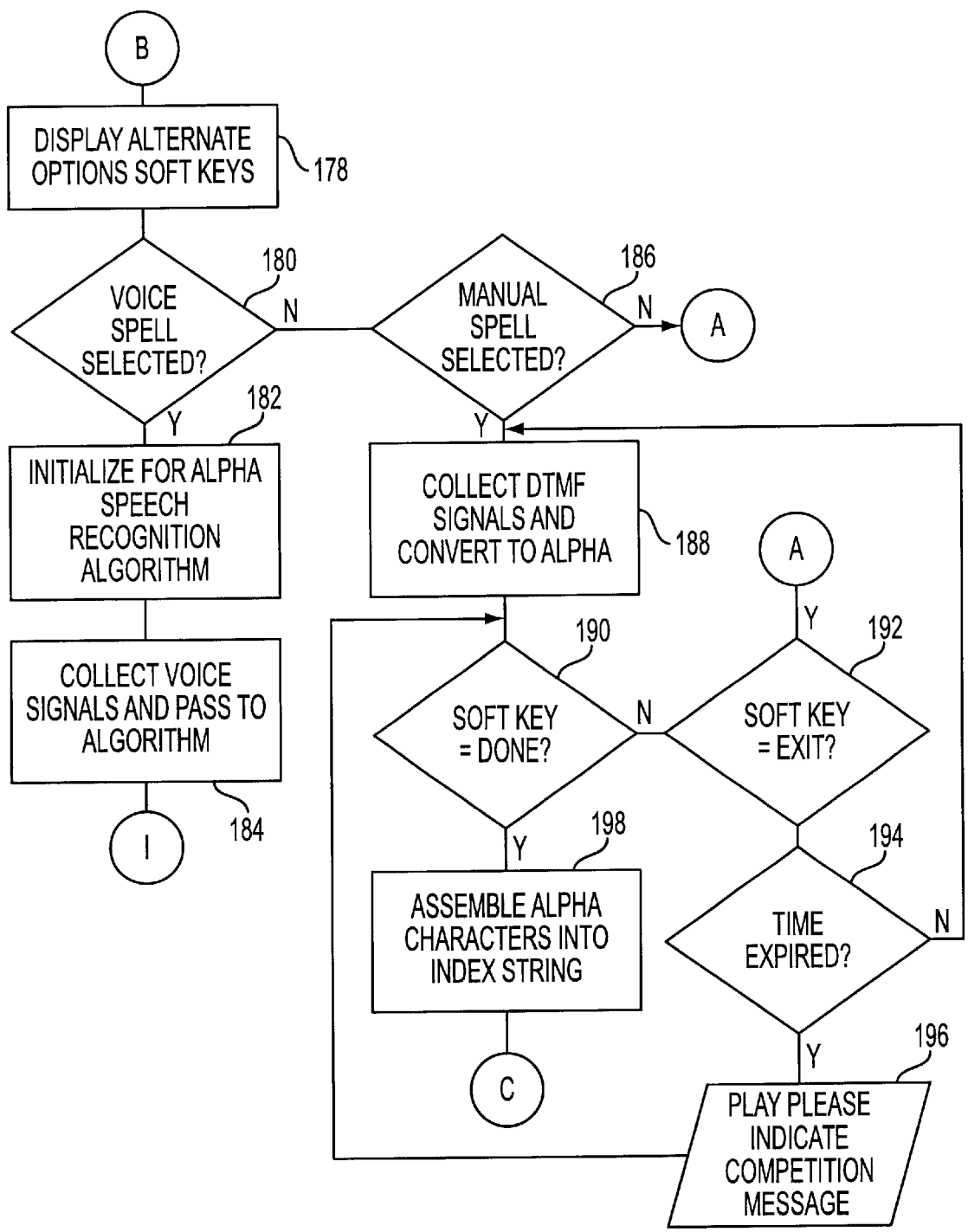

FIG. 4*e* illustrates the logic involved in providing a caller with another way of entering an index used as a database lookup when speech recognition fails. In step 178, the access server 16 sends soft key options to the ADSI display telephone 10 providing the caller with an opportunity to select another way of entering an index. The soft key options may be accompanied with a pre-recorded voice announcement instructing the caller respecting the options. The access server 16 monitors the connection in step 180 to determine whether the caller has elected to spell the index verbally. If that option is selected, the access server 16 initializes for an alpha speech recognition algorithm in step 182 and collects the voice signals in step 184 which are passed to the alpha speech recognition algorithm. Control is then passed to connector "I" (see FIG. 4*b*) and program execution proceeds as explained above with reference to FIGS. 4*b*, 4*c* and 4*d*. If voice spelling is not selected in step 180, it is determined whether manual spelling is selected in step 186. It will be understood by those skilled in the art that various incorrect key selection and time-out provisions are provided in the program but are not illustrated here for sake of simplicity.

If manual spelling is selected in step 186, the access server 16 collects the DTMF signals in step 188 and converts them to alpha characters as described above with reference to FIG. 3. Concurrently, the access server 16 monitors the connection for a soft key signal indicating that the entire index has been spelled in step 190. If the soft key signal does not indicate that the spelling is complete, it is determined in step 192 whether the soft key is a request to exit. If so, the user is returned to connector "A" (see FIG. 4*b*) and program execution continues. Otherwise, a predetermined time lapse is monitored in step 194. If the predetermined time is determined to have a elapsed in step 194, a pre-recorded announcement is played in step 196 requesting that the caller indicate completion of the manual spelling or indicate that the spelling is completed. When an indication of completion is determined in step 190, the collected alpha characters are assembled into an index string in step 198 and the program returns to connector "C" (see FIG. 4*c*) where the index is stored in step 148 and the program execution continues.

Figure 5:
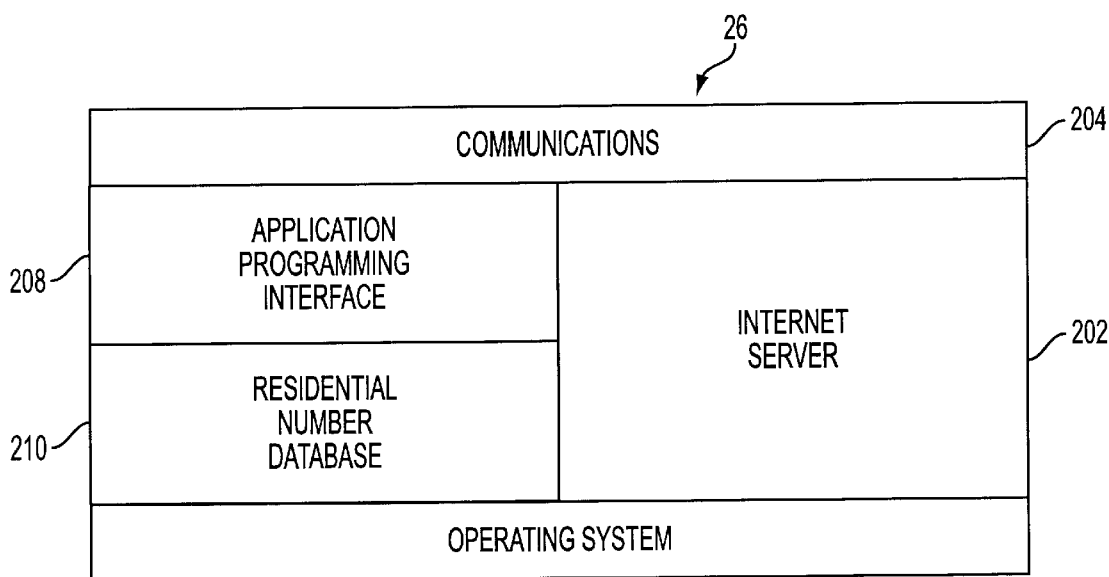
FIG. 5, which appears on sheet 2 of the drawings, is a block diagram of a telephone directory database accessed using the method and apparatus in accordance with the invention.

FIG. 5 shows an exemplary configuration for a 411 directory of residential numbers (see FIGS. 1, 3) accessed by the apparatus in accordance with the invention. The 411 directory 26 is supported by at least one computer having an operating system 200 which runs an Internet server application 202. A communications interface 204 permits the directory to be connected to the wide area network 24 (see FIG. 1). The Internet server receives queries through the communications interface 204 from the wide area network 24. The queries are passed from the access server 16 in TCP/IP format, well known in the art. The Internet server 54 passes queries received from the access server 16 to an Application Programming Interface (API) 208 which extracts one or more appropriate records from the database 210 in response to the query. A response message is formulated by the API 208 and returned to Internet server 202. The Internet server 202 addresses the response and sends it back to a querying access server 16 (see, FIG. 1), as was explained above with reference to FIGS. 3 and 4*a–e*.

It will be understood by those skilled in the art that the methods and apparatus described above may be implemented in many applications and in many different ways. Although the application described for purposes of illustration was the retrieval of information from a database, and in particular, telephone numbers from a directory assistance service, this is only one of a great many applications for the methods and apparatus in accordance with the invention. For example, the invention may be used to automate product sales, to make reservations for food or lodging, or to enable any other transaction which is usefully or preferably accomplished by voice over communications lines. The scope of the invention is therefore intended to be limited solely by the scope of the appended claims.

We claim:

1. A method of improving the utility of speech recognition of words spoken by a speaker, comprising:

a) capturing in electronic form using a telephone voice terminal connected to a telephone network a word spoken by the speaker, the word being captured at an access server which is accessed by the speaker using a connection over a voice grade telephone line;

b) passing the word to a speech recognition algorithm in the telephone network;

c) receiving from the speech recognition algorithm at least one representation of the word;

d) displaying for the speaker as text the at least one representation of the word to permit the speaker to select a correct representation of the word from among the at least one representation; and e) repeating the steps of a)–d) in an event that none of the representation of the word are verified as correct, or enabling the speaker to communicate the at least one word to the access server in another way.

2. A method of improving the utility of speech recognition of words spoken by a speaker as claimed in claim 1 wherein the telephone is a display telephone which conforms to an Analog Display Services Interface (ADSI) standard.

3. A method of improving the utility of speech recognition of words spoken by a speaker as claimed in claim 1 wherein the speech recognition algorithm resides on another server connected to the access server by a communications network.

4. A method of improving the utility of speech recognition of words spoken by a speaker as claimed in claim 1 wherein the other way of communicating the word comprises verbally spelling the word and the speech recognition algorithm to which the word is passed is an alpha speech recognition algorithm.

5. A method of improving the utility of speech recognition of words spoken by a speaker as claimed in claim 1 wherein the speaker communicates the word in another way by manually spelling the word using a dial pad of a display telephone.

6. A method of improving the utility of speech recognition of words spoken by a speaker as claimed in claim 5 wherein keys on the dial pad are pressed once for each relative position of a letter on the key in order to manually spell the spoken name so that if the letter appears in a first position on the key, the key is pressed once to produce the letter, if the letter is in a second position on the key, the key is pressed twice to produce the letter and if the letter is in a third position on the key, the key is pressed three times to produce the letter.

7. A method of automating telephone directory services for a telephone user having a display telephone, comprising the steps of:

a) prompting the user for names used as indicia to locate an entity in the directory;
b) accepting from the user a spoken name for each index;
c) passing each spoken name to a speech recognition algorithm and accepting from the speech recognition algorithm at least one representation of the spoken name;
d) displaying as text on the display telephone the at least one representation of the spoken name to permit the user to select a correct representation of the spoken name; and
e) assembling a query to the directory after a correct representation of each index has been selected in order to retrieve a record for the entity from the directory.

8. A method of automating telephone directory services for a telephone user having a display telephone as claimed in claim 7 further comprising the step of providing the user with another way of entering an index in an event that the desired index cannot be recognized by the speech recognition algorithm.

9. A method of automating telephone directory services for a telephone user having a display telephone as claimed in claim 8 wherein the other way of entering the index comprised enabling the user to verbally spell the spoken name.

10. A method of automating telephone directory services for a telephone user having a display telephone as claimed 8 wherein the other way of entering the index comprises enabling the user to manually spell the spoken name using the dial pad of the display telephone.

11. A method of automating telephone directory services for a telephone user having a display telephone as claimed in claim 7 wherein the steps of prompting, accepting, passing and assembling are accomplished by an access server which may be accessed by the user by dialing a predetermined telephone number.

12. A method of automating telephone directory services for a telephone user having a display telephone as claimed in claim 11 wherein the step of displaying is accomplished by passing the representations from the access server to the display telephone over a telephone line along with commands which enable the display telephone to display the representations as text for the user.

13. Apparatus for improving the utility of speech recognition of words spoken by a speaker, comprising a server in a network enabled to receive voice and data signals over a voice grade connection in a switched telephone network, the server being programmed to prompted the speaker for spoken words which are received from the voice grade connection as voice signals and to pass the spoken words to a speech recognition algorithm which returns representations of the spoken words to the server; the server being further enabled to pass the representations of the spoken words to a voice terminal with a display surface which displays the representations for the speaker to permit the speaker to select a correct representation of the spoken words to thus improve the utility of the speech recognition of the words.

14. Apparatus for improving the utility of speech recognition of words spoken by a speaker as claimed in claim 13 wherein the speech recognition algorithm resides on another server connected to the network.

15. Apparatus for improving the utility of speech recognition of words spoken by a speaker as claimed in claim 13 wherein the apparatus is used to provide automated telephone directory services and the spoken words are used as indicia for retrieving subscriber information from a telephone directory connected to a wide area network which may be accessed by the server.

16. Apparatus for improving the utility of speech recognition of words spoken by a speaker as claimed in claim 13 wherein the server may selectively pas words to an alpha speech recognition algorithm to enable the user to verbally spell a spoken name if a spoken version of the spoken name cannot be interpreted by the speech recognition algorithm.

17. A method of improving the utility of speech recognition of words spoken by a speaker, comprising:
a) capturing an electronic signal, using an Analog Display Services Interface (ADSI) telephone, representative of a word spoken by the speaker;
b) sending the electronic signal through the Public Switched Telephone Network (PSTN) to a speech recognition algorithm;
c) receiving via the PSTN from the speech recognition algorithm at least one representation of the word;
d) displaying on a display surface of the ADSI telephone the at least one representation of the word for the speaker, to permit the to select a correct representation of the word from among the at least one representation; and
e) repeating steps a)–c) in an event that none of the representations of the word are verified as correct, or enabling the speaker to communicate the at least one word using a key pad of the ADSI telephone.

18. The method as claimed in claim 17 wherein prior to step a), the speaker dials a predetermined number to access a server connected to the PSTN by a voice grade connection.

19. The method as claimed in claim 17 wherein the words spoken by a speaker is an index for retrieving a record of interest from a database.

20. The method as claimed in claim 19 wherein the database is one of a "411" database of residential telephone numbers; a Yellow Pages database of the telephone numbers of business advertisers; a database of business telephone numbers; a database of toll free telephone numbers; and, a global database which may include a variety of information respecting entities for which records exist.

21. Apparatus for improving the utility of speech recognition of words spoken by a speaker, comprising in combination:
a server in a network adapted to receive voice and data signals over a voice grade connection in a switched telephone network, the server being programmed to prompt the speaker for spoken words which are received via the voice grade connection as voice signals, and to pass the voice signals to a speech recognition algorithm that returns representations of, the spoken word to the server; the server being further adapted to send the representations over the voice grade connection to an Analog Display Services Interface (ADSI) telephone, which displays the representation for the speaker to permit the speaker to select a correct representation of the spoken word to improve the utility of the speech recognition of the spoken words.

22. Apparatus as claimed in claim 21 wherein the server is further adapted to assemble a query using one or more of the words spoken by the speaker, and further adapted to send the query to a database to retrieve a record of interest.

23. Apparatus as claimed in claim 22 wherein the database is one of a "411" database of residential telephone numbers; a Yellow Pages database of the telephone numbers of business advertisers; a database of business telephone numbers; a database of toll free telephone numbers; and, a global database which may include a variety of information respecting entities for which records exist.

24. A method of automatically information retrieval from a database for a telephone user having an Analog Display Service Interface (ADSI) telephone, comprising the steps of:
   a) prompting the user for spoken words used as indicia to locate information of interest in the database;
   b) accepting at least one of the spoken words from the user;
   c) passing an electronic representation of each spoken word to a speech recognition algorithm and accepting from the speech recognition algorithm at least one representation of the spoken word;
   d) displaying as text on the ADSI telephone the at least one representation of the spoken word to permit the user to select a correct representation of the spoken word; and
   e) assembling a query to the database after a correct representation of each spoken word has been selected by the user, in order to retrieve the information from the database.

25. The method as claimed in claim 24 wherein the database is a telephone directory services database.

26. The method as claimed in claim 25 wherein the database is one of a "411" database of residential telephone numbers; a Yellow Pages database of the telephone numbers of business advertisers; a database of business telephone numbers; a database of toll free telephone numbers; and, a global database which may include a variety of information respecting entities for which records exist.

* * * * *